(12) United States Patent
Bernstein et al.

(10) Patent No.: US 8,250,303 B2
(45) Date of Patent: Aug. 21, 2012

(54) ADAPTIVE LINESIZE IN A CACHE

(75) Inventors: Kerry Bernstein, Underhill, VT (US); Moinuddin K. Qureshi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 12/570,440

(22) Filed: Sep. 30, 2009

(65) Prior Publication Data

US 2011/0078382 A1   Mar. 31, 2011

(51) Int. Cl.
*G06F 13/00* (2006.01)
*G06F 12/00* (2006.01)

(52) U.S. Cl. .................. 711/118; 711/170; 711/E12.041

(58) Field of Classification Search .................. 711/118, 711/170, E12.041
See application file for complete search history.

(56) References Cited

U.S. PATENT DOCUMENTS

| | | | |
|---|---|---|---|
| 4,994,962 A | 2/1991 | Mageau et al. | |
| 6,094,711 A | 7/2000 | Wong | |
| 6,243,791 B1 * | 6/2001 | Vondran, Jr. | .................. 711/120 |
| 6,549,983 B1 | 4/2003 | Han et al. | |
| 6,751,705 B1 | 6/2004 | Solomon et al. | |
| 2004/0015683 A1 | 1/2004 | Emma et al. | |
| 2006/0095535 A1 | 5/2006 | Govindaraju et al. | |
| 2008/0256303 A1 * | 10/2008 | Croxford et al. | .............. 711/144 |

FOREIGN PATENT DOCUMENTS

WO    WO 2006034289 A1    3/2006

OTHER PUBLICATIONS

Gonzalez, Antonio et al., "A Data Cache with Multiple Caching Strategies Tuned to Different Types of Locality", Universitat Politecnica de Catalunya, Barcelona Spain, 1995, 17 pages.
Johnson, Teresa L. et al., "Run-time Spatial Locality Detection and Optimization", Proceedings of the 30th International Symposium on Microarchitecture, http://www.crhc.uiuc.edu/IMPACT/ftp/conference/micro-97-spatial.pdf, 1997, 9 pages.
Prvulovic, Milos et al., "Split Temporal/Spatial Cache: A Survey and Reevaluation of Performance", TCCA Newsletters, Inst. of Electrical and Electronics Engineers, Inc., 1999, pp. 1-10.
Wang, Xi et al., "Application Directed Explicit Management for Advanced Cache Architectures", Technical Report, Department of Electrical Engineering, University of Southern California, Sep. 1998, pp. 1-16.

* cited by examiner

*Primary Examiner* — Edward Dudek, Jr.
(74) *Attorney, Agent, or Firm* — Stephen R. Tkacs; Stephen J. Walder, Jr.; William Stock (57) ABSTRACT

A mechanism is provided in a cache for emulating larger linesize in a substrate with smaller linesize using gang fetching and gang replacement. Gang fetching fetches multiple lines on a cache miss to ensure that all smaller lines that make up the larger line are resident in cache at the same time. Gang replacement evicts all smaller lines in cache that would have been evicted had the cache linesize been larger. The mechanism provides adaptive linesize using set dueling by dynamically selecting between multiple linsizes depending on which linesize performs the best at runtime. Set dueling dedicates a portion of sets of the cache to always use smaller linesize and dedicates one or more portions of the sets of cache to always emulate larger linesizes. One or more counters keep track of which linesize has the best performance. The cache uses that linesize for the remainder of the sets.

20 Claims, 7 Drawing Sheets

FIG. 3A SMALLER LINESIZE

FIG. 3B LARGER LINESIZE

FIG. 3C EMULATION

ADAPTIVE LINESIZE IN A CACHE

BACKGROUND

The present application relates generally to an improved data processing apparatus and method and more specifically to an apparatus and method for gang fetching, gang replacement, and adaptive linesize in a cache.

A cache is used to speed up data transfer and may be either temporary or permanent. Memory caches are in every computer to speed up instruction execution and data retrieval and updating. These temporary caches serve as staging areas, and their contents are constantly changing. A memory cache, or "CPU cache," is a memory bank that bridges main memory and the central processing unit (CPU). A memory cache is faster than main memory and allows instructions to be executed and data to be read and written at higher speed. Instructions and data are transferred from main memory to the cache in fixed blocks, known as cache "lines."

Caches take advantage of "temporal locality," which means the same data item is often reused many times. Caches also benefit from "spatial locality," wherein the next instruction to be executed or the next data item to be processed is likely to be the next in line. The more often the same data item is processed or the more sequential the instructions or data, the greater the chance for a "cache hit." If the next item is not in the cache, a "cache miss" occurs, and the CPU may go to main memory to retrieve it.

Caches are organized at a linesize granularity to exploit spatial locality. Using large linesize provides a performance improvement proportional to the amount of spatial locality in the memory reference stream. However, when spatial locality is low, using a large linesize may hurt cache performance. Smaller linesize provides a higher number of lines for a given space and less pressure on bandwidth.

The cache linesize may be determined at runtime depending on the spatial locality of the application. Unfortunately, current systems use the same linesize for all applications.

SUMMARY

In one illustrative embodiment, a method, in a data processing system, is provided for adaptive linesize in a cache having a plurality of sets. The method comprises configuring each of a plurality of groups of policy sets within the plurality of sets to use a corresponding policy linesize. Each policy linesize is a different multiple of a base linesize of the cache. The method further comprises identifying a group of policy sets to follow based on a given performance metric and configuring a group of follower sets within the plurality of sets to use the policy linesize of the identified group of policy sets.

In another illustrative embodiment, a computer program product comprises a computer recordable medium having a computer readable program recorded thereon. The computer readable program, when executed on a computing device, causes the computing device to configure each of a plurality of groups of policy sets within the plurality of sets to use a corresponding policy linesize. Each policy linesize is a different multiple of a base linesize of the cache. The computer readable program further causes the computing device to identify a group of policy sets to follow based on a given performance metric and configure a group of follower sets within the plurality of sets to use the policy linesize of the identified group of policy sets.

In yet another illustrative embodiment, an apparatus comprises a cache memory having a plurality of sets and a cache controller connected to the cache memory. The cache controller is configured to configure each of a plurality of groups of policy sets within the plurality of sets to use a corresponding policy linesize. Each policy linesize is a different multiple of a base linesize of the cache memory. The cache controller is further configured to identify a group of policy sets to follow based on a given performance metric and configure a group of follower sets within the plurality of sets to use the policy linesize of the identified group of policy sets.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for emulating larger linesize in a substrate with smaller linesize using gang fetching and gang replacement. Gang fetching fetches multiple lines on a cache miss to ensure that all smaller lines that make up the larger line are resident in cache at the same time. Gang replacement evicts all smaller lines in the cache that would have been evicted had the cache linesize been larger.

The illustrative embodiments also provide a mechanism for adaptive linesize using set dueling. The mechanism dynamically selects between multiple linsizes depending on which linesize performs the best at runtime. Set dueling dedicates a portion of sets of the cache to always use the smaller linesize and dedicates one or more portions of the sets of the cache to always emulate larger linesizes. One or more counters keep track of which linesize has the best performance. The cache uses that linesize for the remainder of the sets.

Figure 1:
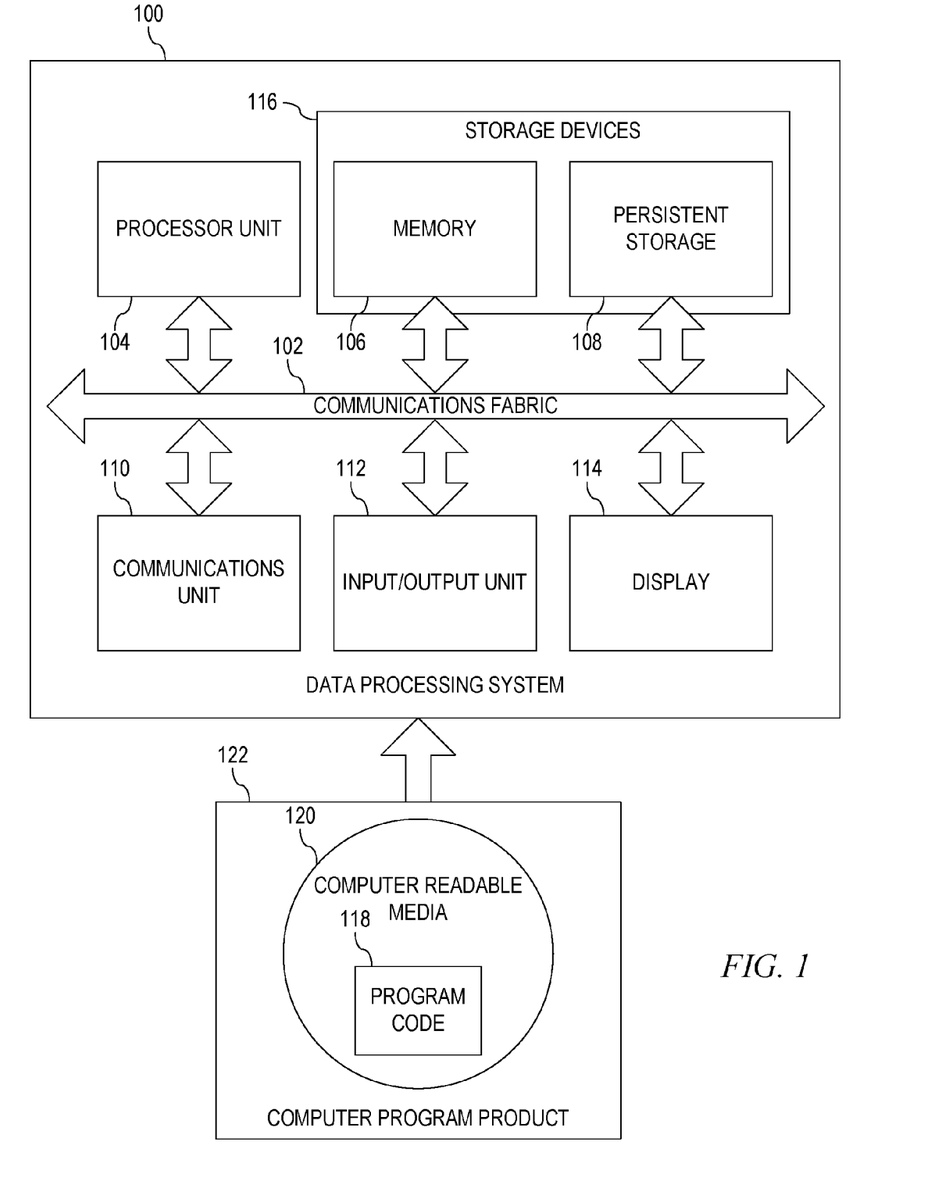
FIG. 1 depicts a block diagram of a data processing system in which illustrative embodiments may be implemented.
Figure 2:
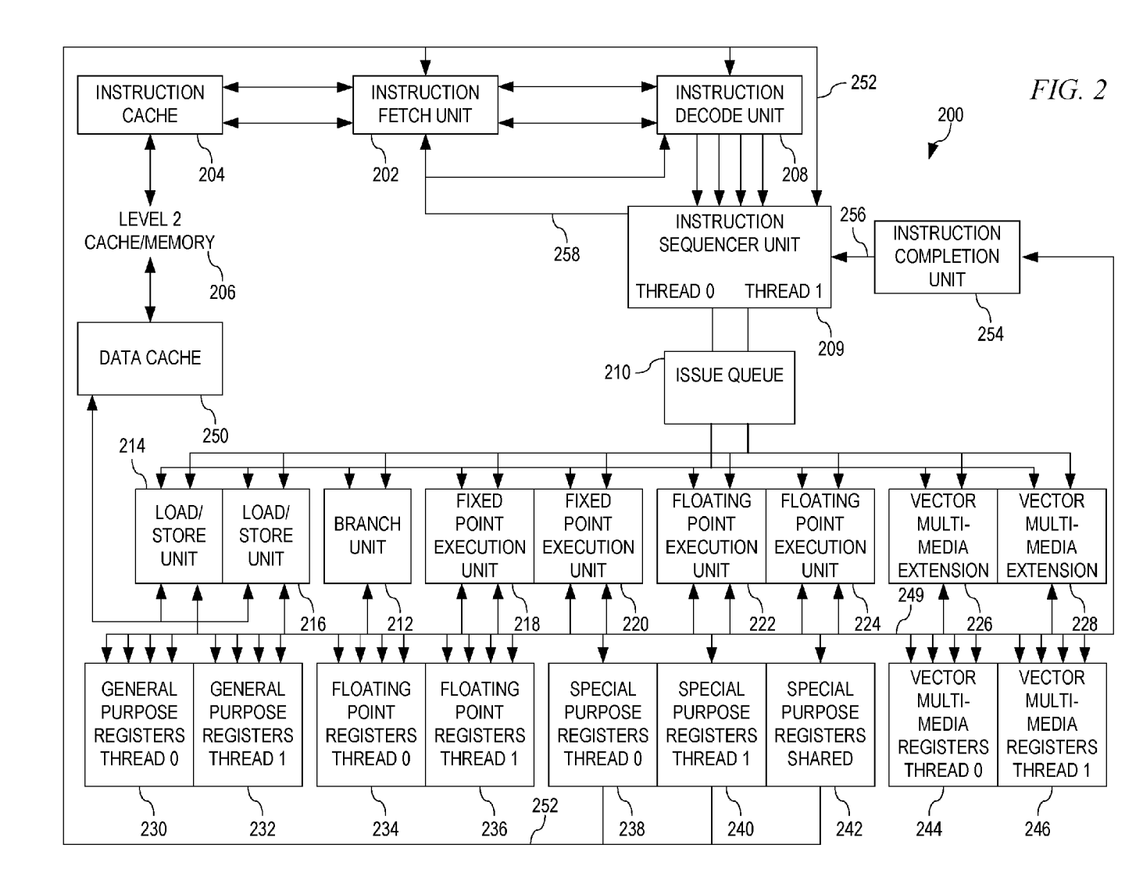
FIG. 2 is an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that are selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 are also referred to as a computer recordable storage medium. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache. As used herein, the term "cache" refers to a cache memory and associated logic, i.e. the cache controller.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

In one illustrative embodiment, a mechanism is provided in a cache for emulating larger linesize in a substrate with smaller linesize using gang fetching and gang replacement. Gang fetching fetches multiple lines on a cache miss to ensure that all smaller lines that make up the larger line are resident in cache at the same time. Gang replacement evicts all smaller lines in the cache that would have been evicted had the cache linesize been larger.

Figure 3A:
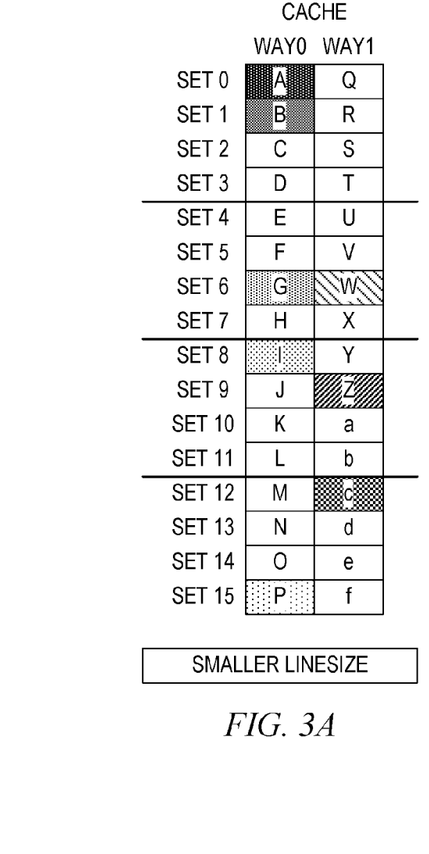
FIGS. 3A-3C illustrate emulation of larger linesizes in a smaller linesize cache using gang fetching and gang replacement in accordance with an illustrative embodiment.
Figure 3B:
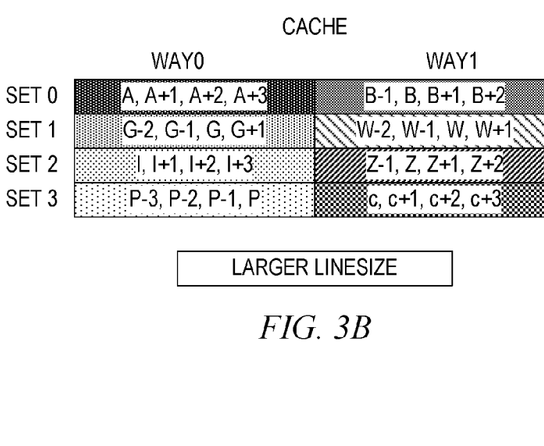
Figure 3C:
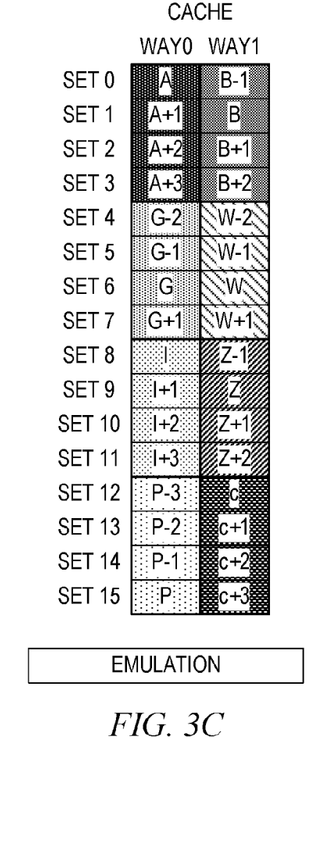

FIGS. 3A-3C illustrate emulation of larger linesizes in a smaller linesize cache using gang fetching and gang replacement in accordance with an illustrative embodiment. More particularly, FIG. 3A illustrates a smaller linesize cache in accordance with an example embodiment. In the smaller linesize example, a 2 KB two-way cache with 64 B linesize is shown. This cache has 16 sets and stores up to 32 unique lines. Each cache line is 64 B. As used herein, the term "cache" refers to a cache memory and associated logic, i.e. the cache controller.

FIG. 3B illustrates a larger linesize cache in accordance with an example embodiment. In the larger linesize example, the same 2 KB two-way cache is shown with the linesize quadrupled to 256 B. Thus, the cache contains only 4 sets and can hold up to 8 lines in the cache. However, each line is four times as large. Note that instead of line A in set 0, way 0, the cache in the larger linesize example now contains a 256 B line comprising line A and the next three lines. Similarly, for line B, in set 0, way 1, the cache now contains the line previous to B, line B, and the next two lines.

FIG. 3C illustrates an emulated larger linesize in a smaller linesize cache in accordance with an illustrative embodiment. In accordance with the illustrative embodiment, the emulation example shows emulation of a 256 B linesize cache on a cache that has a 64 B linesize. The cache groups four 64 B lines to form one 256 B line. The cache is modified to control the fetch and replacement so that the group remains intact. On a cache miss for line B, for example, the cache controller checks whether lines B−1, B, B+1, and B+2 are resident in the cache. If not, the cache installs all lines so that the group of "B−1, B, B+1, and B+2" is formed. This technique is referred to herein as "gang fetching."

On a cache access to any line in the group, the replacement information of all lines in the group is touched to update the least recently used (LRU) information. In an example embodiment, an optimization may be to update only one set, e.g., set 0, and have no replacement information in set 1, set 2, and set 3. Then, replacement decisions of sets 0-3 are always decided by set 0.

When a cache line is replaced from the group, the cache controller evicts all lines in the group. This is referred to herein as "gang replacement." Gang replacement prevents the group from being broken when some lines in the group are accessed more frequently than others.

In one illustrative embodiment, a mechanism is provided in a cache for adaptive linesize using set dueling. The mechanism dynamically selects between multiple linsizes depending on which linesize performs the best at runtime. Set dueling dedicates a portion of sets of the cache to always use the smaller linesize and dedicates one or more portions of the sets of the cache to always emulate larger linesizes. One or more counters keep track of which linesize has the best performance. The cache uses that linesize for the remainder of the sets.

Figure 4A:
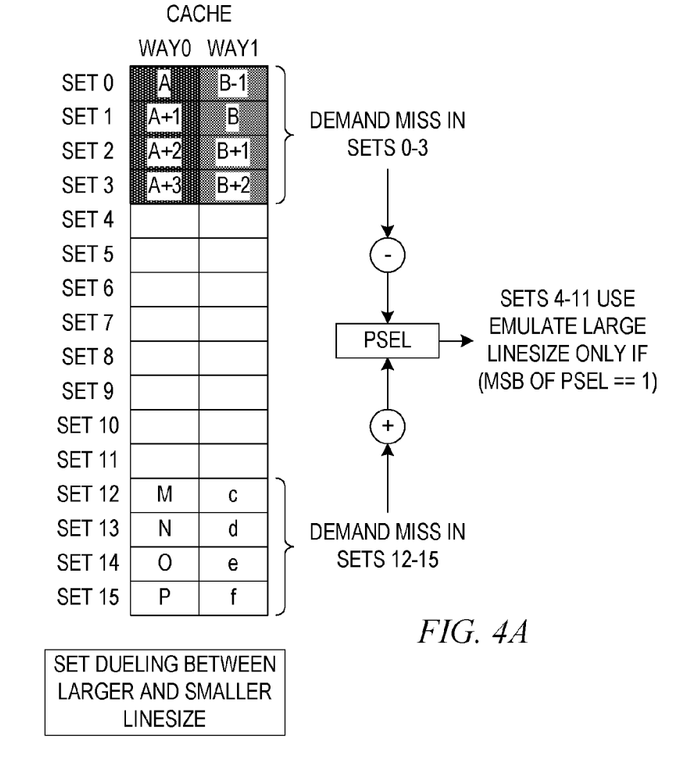
FIGS. 4A-4C illustrate adaptive linesize in a cache using set dueling in accordance with an illustrative embodiment.
Figure 4B:
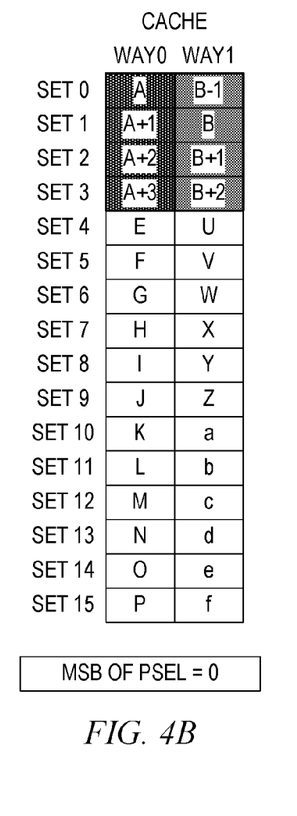
Figure 4C:
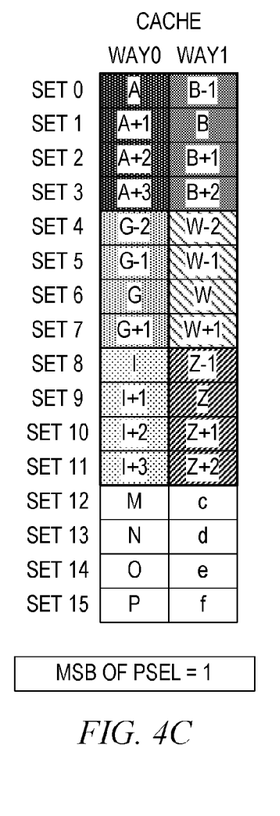

FIGS. 4A-4C illustrate adaptive linesize in a cache using set dueling in accordance with an illustrative embodiment. More particularly, FIG. 4A illustrates set dueling between larger and smaller linesize in accordance with the illustrative embodiment. Set dueling dedicates some sets (sets 0-3) to always emulate large 256 B linesize and some sets (sets 12-15) to always use the smaller 64 B linesize. A saturating policy select counter (PSEL) tracks which of the two linesizes incurs fewer misses. Responsive to a demand miss in sets 0-3, the cache decrements the counter, and responsive to a demand miss in sets 12-15, the cache increments the counter.

In the depicted example and implementation, the most significant bit (MSB) of the PSEL counter decides the linesize of sets 4-11. If the MSB of PSEL is zero, then sets 4-11 use the smaller linesize; otherwise, sets 4-11 emulate the larger linesize. FIG. 4B shows the cache state when the MSB of PSEL is zero, which results in 75% of the sets having smaller linesizes. Similarly, when the MSB of PSEL is one, 75% of the sets in the cache emulate the larger linesize as illustrated in FIG. 4C.

In practice, caches may contain thousands of sets, and set dueling may dedicate only about 32-64 sets, for example, to the two policies. Thus, adaptive linesize using set dueling may use the best linesize for well over 95% of the sets in the cache. Furthermore, the mechanism shown in FIGS. 4A-4C uses miss counts to decide the best linesize; however, other metrics, such as memory stall time for example, may be used to decide the best linesize. For instance, a miss in sets 0-3 may decrement the PSEL counter by the number of cycles the processor is stalled on the demand miss. Similarly, a miss in sets 12-15 may increment the PSEL counter by the number of stall cycles. Then, the MSB of the PSEL counter indicates which linesize minimizes the memory related stalls and that linesize may be chosen for sets 4-11.

Other modifications may be made to the adaptive linesize mechanism without departing from the spirit and scope of the illustrative embodiments. For example, demand misses to sets 0-3 may be weighted differently from demand misses to sets 12-15. For instance, the cache may decrement the PSEL counter twice responsive to a demand miss in sets 0-3, while the cache may increment the PSEL counter only once responsive to a demand miss in sets 12-15.

Figure 5:
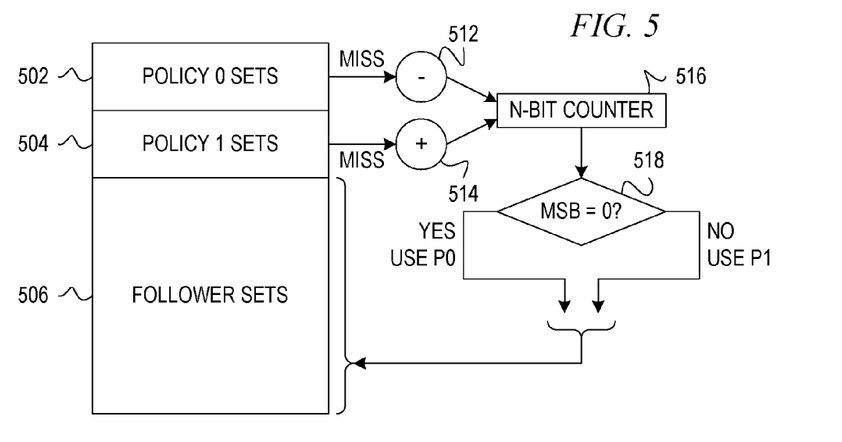
FIG. 5 is a block diagram depicting a mechanism for adaptive linesize by selecting between two policies in a cache in accordance with an illustrative embodiment.

FIG. 5 is a block diagram depicting a mechanism for adaptive linesize by selecting between two policies in a cache in accordance with an illustrative embodiment. The cache sets in the cache are divided into three groups of sets, including policy0 sets 502, policy1 sets 504, and follower sets 506. In one example embodiment, policy0 sets 502 may emulate larger linesize, and policy1 sets 504 may use smaller linesize. Alternatively, policy0 sets 502 may use smaller linesize, and policy1 sets 504 may emulate larger linesize.

Responsive to a demand miss in policy0 sets 502, the mechanism performs a decrement operation 512 on N-bit counter 516. Responsive to a demand miss in policy1 sets 504, the mechanism performs an increment operation 514 on N-bit counter 516. The mechanism performs a comparison operation 518 to compare the most significant bit (MSB) of the N-bit counter 516 to zero. If the MSB of the N-bit counter 516 is zero, the mechanism configures follower sets 506 to use policy0; otherwise, the mechanism configures follower sets 506 to use policy1.

Figure 6:
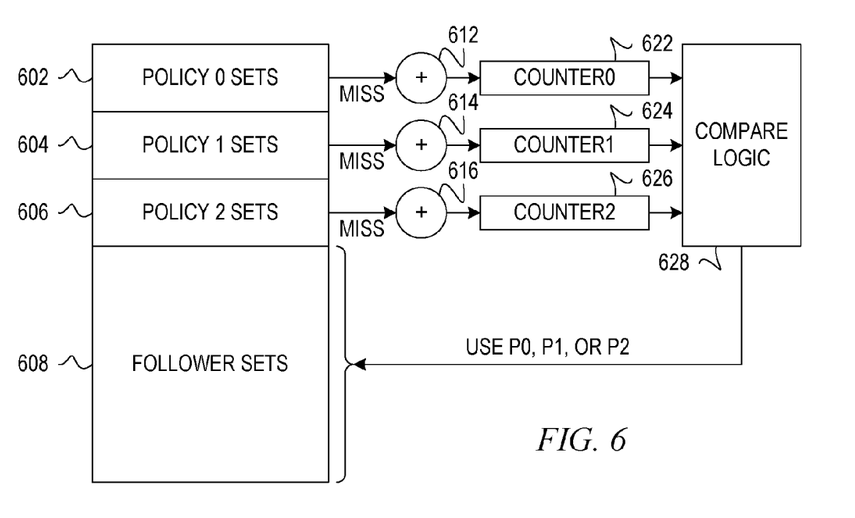
FIG. 6 is a block diagram depicting a mechanism for adaptive linesize by selecting between two or more policies in a cache in accordance with an illustrative embodiment.

FIG. 6 is a block diagram depicting a mechanism for adaptive linesize by selecting between two or more policies in a cache in accordance with an illustrative embodiment. The sets of the cache are divided into groups of sets, including policy0 sets 602, policy1 sets 604, policy2 sets 606, and follower sets 608 in the depicted example. The sets of the cache may be divided into more or fewer groups of sets depending upon the implementation. In one example embodiment, policy0 sets 602 may use smaller linesize, policy1 sets 604 may emulate a linesize that is twice the smaller linesize, and policy2 sets 606 may emulate a linesize that is four times the smaller linesize.

Responsive to a demand miss in policy0 sets 602, the mechanism performs an increment operation 612 on counter0 622. Responsive to a demand miss in policy1 sets 604, the mechanism performs an increment operation 614 on counter1 624. Responsive to a demand miss in policy2 sets 606, the mechanism performs an increment operation 616 on counter2 626. Compare logic 628 compares the values of counter0 622, counter1 624, and counter2 626. The mechanism then determines the policy for follower sets 608 based on the counter showing the fewest demand misses. For example, if counter0 622 has a value that is lower than counter1 624 and counter2 626, then the mechanism uses policy0 for follower sets 608. If counter2 626 has a value that is lower than counter0 622 and counter1 624, then the mechanism uses policy2 for follower sets 608.

Figure 7:
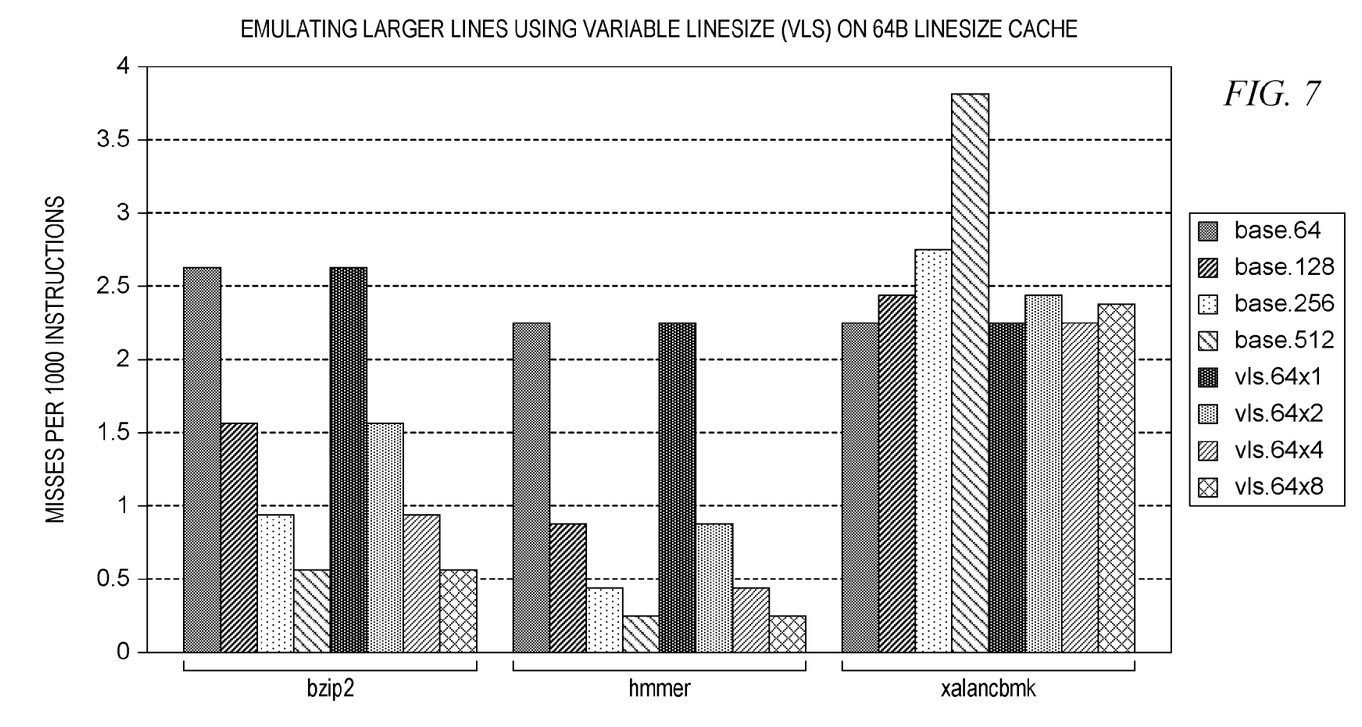
FIG. 7 is a chart depicting the number of misses for three benchmarks using various base linesizes and variable linesizes in accordance with an illustrative embodiment.

FIG. 7 is a chart depicting the number of misses for three benchmarks using various base linesizes and variable linesizes in accordance with an illustrative embodiment. The chart of FIG. 7 shows misses per thousand instructions (MPKI) for benchmarks bzip2, hmmer, and xalancbmk. The benchmark bzip2 is an open source lossless data compression algorithm. The benchmark hmmer is a commonly used software package for protein sequence analysis. The benchmark xalancbmk is based on a robust implementation of W3C Recommendations for extensible stylesheet language (XSL) transformations (XSLT) and the extensible markup language (XML) Path Language (XPath).

The first four bars for each benchmark represent a traditional cache with linesizes of 64 B, 128 B, 256 B, and 512 B, respectively. For bzip2 and hmmer, MPKI reduces as the linesize is increased. However, for xalancbmk, MPKI increases as the linesize is increased from 64 B to 512 B. The next four bars for each benchmark represent variable linesize on a 64 B cache with linesizes of 64×1 (64 B), 64×2 (128 B), 64×4 (256 B), and 64×8 (512 B). The technique was implemented on a 1 MB 8-way 64 B linesize cache, with 32 sets dedicated for the 64 B linesize and another 32 sets for a larger linesize.

Four configurations are shown, when the size of the larger linesize is the same as baseline (64 B), double the baseline (128 B), quadruple the baseline (256 B), and eight times the baseline (512 B). The remaining sets use the policy decided by a 9-bit PSEL counter. For bzip2 and hmmer, the technique performs similar to the larger base linesize, whereas for xalancbmk, the technique has MPKI that is similar to 64 B linesize. Thus, the technique uses larger linesize only when it improves cache performance and retains the smaller linesize when increasing the linesize hurts performance.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
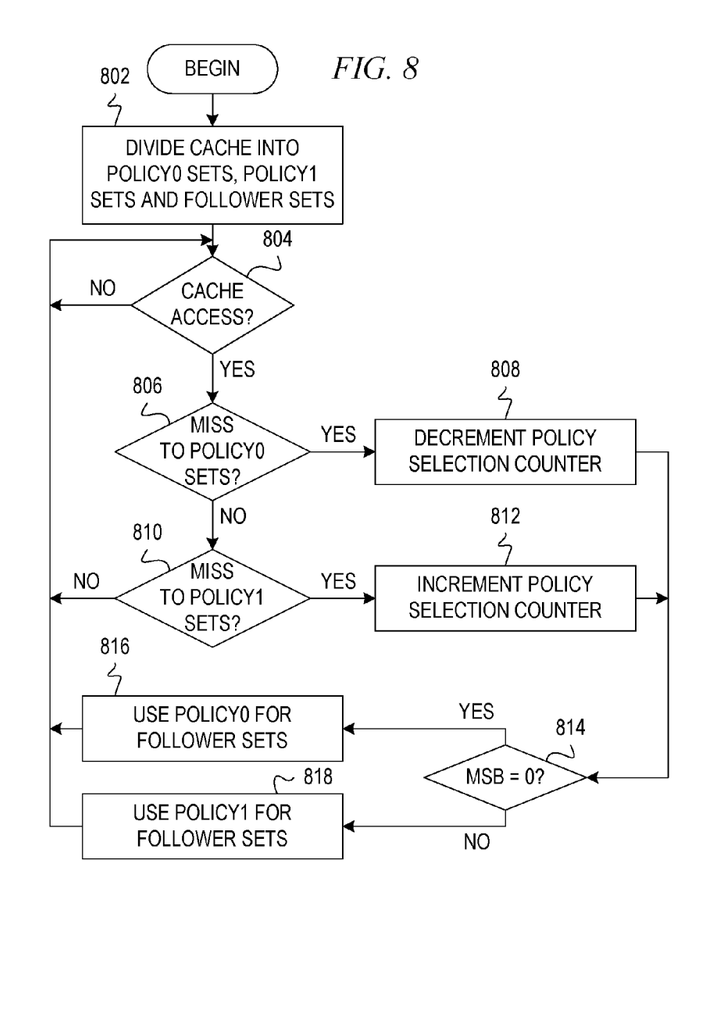
FIG. 8 is a flowchart illustrating operation of a cache mechanism for adaptive linesize by selecting between two policies in a cache in accordance with an illustrative embodiment.

FIG. 8 is a flowchart illustrating operation of a cache mechanism for adaptive linesize by selecting between two policies in a cache in accordance with an illustrative embodiment. Operation begins, and the mechanism divides the cache into policy0 sets, policy1 sets, and follower sets (block 802). The mechanism determines whether a cache access is being performed (block 804). If the mechanism determines that a cache access is not being performed, operation returns to block 804 until a cache access is performed.

If the mechanism determines that a cache access is being performed in block 802, the mechanism determines whether the cache access results in a miss to the policy0 sets (block 806). If the cache access results in a miss to the policy0 sets, the mechanism decrements a policy selection counter (block 808). If the cache access does not result in a miss to the policy0 sets in block 806, the mechanism determines whether the cache access results in a miss to the policy1 sets (block 810). If the mechanism determines that the cache access results in a cache miss to the policy1 sets, the mechanism increments the policy selection counter (block 812). If the cache access does not result in a miss to the policy1 sets in block 810, operation returns to block 804 to determine whether a cache access is being performed.

Responsive to the mechanism decrementing or incrementing the policy selection counter in block 808 or block 812, respectively, the mechanism determines whether the most significant bit (MSB) of the policy selection counter is zero (block 814). If the MSB of the policy select counter is zero, the mechanism uses policy0 for the follower sets (block 816), and operation returns to block 804 to determine whether a cache access is being performed. If the MSB of the policy select counter is not zero in block 814, the mechanism uses policy1 for the follower sets (block 818), and operation returns to block 804 to determine whether a cache access is being performed.

Figure 9:
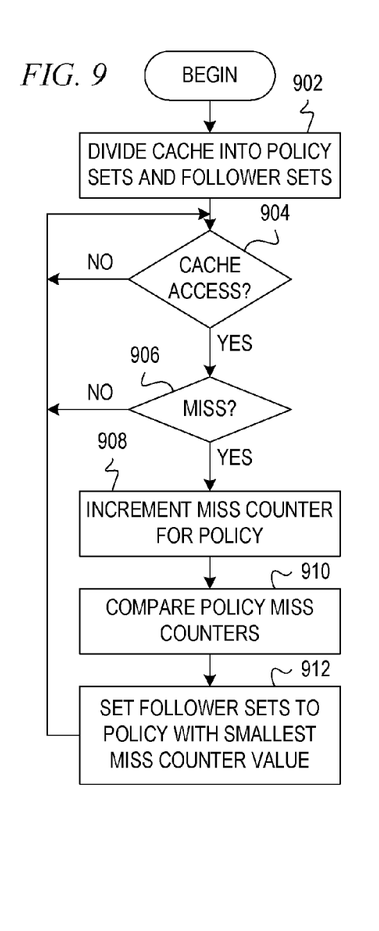
FIG. 9 is a flowchart illustrating operation of a cache mechanism for adaptive linesize by selecting between two or more policies in a cache in accordance with an illustrative embodiment.

FIG. 9 is a flowchart illustrating operation of a cache mechanism for adaptive linesize by selecting between two or more policies in a cache in accordance with an illustrative embodiment. Operation begins, and the mechanism divides the cache into two or more groups of policy sets and a group of follower sets (block 902). The mechanism determines whether a cache access is being performed (block 904). If the mechanism determines that a cache access is not being performed, operation returns to block 904 until a cache access is performed.

If the mechanism determines that a cache access is being performed in block 904, the mechanism determines whether the cache access results in a miss (block 906). If the cache access does not result in a miss, operation returns to block 904 to determine whether a cache access is being performed.

If the mechanism determines that the cache access results in a miss in block 906, the mechanism increments a miss counter for the policy (block 908). Then, the mechanism compares the policy miss counters (block 910) and sets the follower sets to the policy with the smallest miss counter value (block 912). Thereafter, operation returns to block 904 to determine whether a cache access is being performed.

Thus, the illustrative embodiments provide mechanisms for emulating larger linesize in a substrate with smaller linesize using gang fetching and gang replacement. Gang fetching fetches multiple lines on a cache miss to ensure that all smaller lines that make up the larger line are resident in cache at the same time. Gang replacement evicts all smaller lines in the cache that would have been evicted had the cache linesize been larger. The illustrative embodiments also provide a mechanism for adaptive linesize using set dueling. The mechanism dynamically selects between multiple linsizes depending on which linesize performs the best at runtime. Set dueling dedicates a portion of sets of the cache to always use the smaller linesize and dedicates one or more portions of the sets of the cache to always emulate larger linesizes. One or more counters keep track of which linesize has the best performance. The cache uses that linesize for the remainder of the sets.

When configured to use larger linesize, the mechanism has cache performance similar to large linesize. This configurability is achieved without design changes to the cache structure. Furthermore, other support structures, such as the translation look-aside buffer (TLB), remain unaffected. When used for dynamic selection between multiple linesizes, the mechanism performs similar to knowning the best linesize in an off-line mariner. This selection may be achieved with a storage overhead of one saturating counter. The dynamic selection mechanism may be easily configured to select the linesize that minimizes the miss count, or memory access time, or some other performance metric.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for adaptive linesize in a cache having a plurality of sets of cache lines, the method comprising:
   configuring a first group of policy sets within the plurality of sets of cache lines to use a first policy linesize and a second group of policy sets within the plurality of sets of cache lines to use a second policy linesize, wherein each of the first policy linesize and the second policy linesize is a different multiple of a base linesize of the cache;
   identifying a group of policy sets between at least the first group of policy sets and the second group of policy sets to follow based on a given performance metric, wherein the given performance metric measures performance of the first group of policy sets and the second group of policy sets; and
   configuring a group of follower sets within the plurality of sets of cache lines to use the policy linesize of the identified group of policy sets.

2. The method of claim 1, wherein the given performance metric is a number of demand misses.

3. The method of claim 1, wherein the first policy linesize is equal to the base linesize of the cache and the second policy linesize is equal to a multiple of the base linesize of the cache.

4. The method of claim 1, wherein identifying the group of policy sets to follow comprises:
   decrementing a policy select counter responsive to a demand miss in the first group of policy sets;
   incrementing the policy select counter responsive to a demand miss in the second group of policy sets; and
   identifying the group of policy sets to follow based on a value of the policy select counter.

5. The method of claim 4, wherein identifying the group of policy sets to follow based on the value of the policy select counter comprises determining whether a most significant bit of the policy select counter is zero such that the group of follower sets is configured to use the second policy linesize responsive to the most significant bit of the policy select counter being zero and the group of follower sets is configured to use the first policy linesize responsive to the most significant bit of the policy select counter being one.

6. The method of claim 1, wherein identifying the group of policy sets to follow comprises:
responsive to a demand miss in the first group of policy sets, incrementing a first miss counter corresponding to the first group of policy sets;
responsive to a demand miss in the second group of policy sets, incrementing a second miss counter corresponding to the second group of policy sets; and
identifying a group of policy sets having a miss counter, between at least the first miss counter and the second miss counter, with a lowest value.

7. The method of claim 1, further comprising:
for a given group of policy sets, emulating a larger linesize, wherein the larger linesize is a multiple of the base linesize of the cache and wherein the multiple is two or greater.

8. The method of claim 7, wherein emulating larger linesize comprises:
responsive to a cache miss, fetching multiple cache lines using the base linesize of the cache to he stored in the given group of policy sets.

9. The method of claim 1, wherein each different multiple is a power of two.

10. A computer program product comprising a computer readable storage medium having a computer readable program stored thereon, wherein the computer readable program, when executed on a computing device, causes the computing device to:
configure a first group of policy sets within plurality of sets of cache lines in a cache to use a first policy linesize and a second group of policy sets within the plurality of sets of cache lines to use a second policy linesize, wherein each of the first policy linesize and the second policy linesize is a different multiple of a base linesize of the cache;
identify a group of policy sets between at least the first group of policy sets and the second group of policy sets to follow based on a given performance metric, wherein the given performance metric measures performance of the first group of policy sets and the second group of policy sets; and
configure a group of follower sets within the plurality of sets to use the policy linesize of the identified group of policy sets.

11. The computer program product of claim 10, wherein the computer readable program is stored in a computer readable storage medium in a data processing system and wherein the computer readable program was downloaded over a network from a remote data processing system.

12. The computer program product of claim 10, wherein the computer readable program is stored in a computer readable storage medium in a server data processing system and wherein the computer readable program is downloaded over a network to a remote data processing system for use in a computer readable storage medium with the remote system.

13. An apparatus, comprising:
a cache memory having a plurality of sets of cache lines; and
a cache controller connected to the cache memory, wherein the cache controller is configured to:
configure a first group of policy sets within the plurality of sets of cache lines to use a first policy linesize, wherein each of the first policy linesize and the second linesize is a different multiple of a base linesize of the cache memory;
identify a group of policy sets between at least the first group of policy sets and the second group of policy sets to follow based on a given performance metric, wherein the given performance metric measures performance of the first group of policy sets and the second group of policy sets; and
configure a group of follower sets within the plurality of sets to use the policy linesize of the identified group of policy sets.

14. The apparatus of claim 13, wherein the given performance metric is a number of demand misses.

15. The apparatus of claim 13, wherein the first policy linesize is equal to the base linesize of the cache and the second policy linesize equal to a multiple of the base linesize of the cache.

16. The apparatus of claim 13, wherein identifying the group of policy sets to follow comprises:
decrementing a policy select counter responsive to a demand miss in the first group of policy sets;
incrementing the policy select counter responsive to a demand miss in the second group of policy sets; and
identifying the group of policy sets to follow based on a value of the policy select counter.

17. The apparatus of claim 14, wherein identifying the group of policy sets to follow based on the given performance metric comprises:
responsive to a demand miss in the first group of policy sets, incrementing a first miss counter corresponding to the first group of policy sets;
responsive to a demand miss in the second group of policy sets, incrementing a second miss counter corresponding to the second group of policy sets; and
identifying a group of policy sets having a miss counter, between at least the first miss counter and the second miss counter, with a lowest value.

18. The apparatus of claim 13, wherein the cache controller is further configured to:
for a given group of policy sets, emulating a larger linesize, wherein the larger linesize is a multiple of the base linesize of the cache and wherein the multiple is two or greater.

19. The apparatus of claim 18, wherein emulating larger linesize comprises:
responsive to a cache miss, fetching multiple cache lines using the base linesize of the cache to be stored in the given group of policy sets.

20. The apparatus of claim 13, wherein each different multiple is a power of two.

* * * * *